INVENTOR.
C. S. MORRIS

BY Hudson & Young
ATTORNEYS

2,930,672
METHOD OF REGENERATING AMMONIACAL COPPER SOLUTIONS UTILIZED TO REMOVE CARBON MONOXIDE FROM GASES

Carl S. Morris, Houston, Tex., assignor to Phillips Petroleum Company, a corporation of Delaware Application April 22, 1957, Serial No. 654,331

6 Claims. (Cl. 23—2)

This invention relates to the absorption of carbon monoxide with ammoniacal copper solution. In another aspect, this invention relates to the control of cupric ion concentration in ammoniacal copper solutions. In still another aspect, this invention relates to the synthesis of ammonia employing an improved process for removing carbon monoxide from the synthesis gas.

In ammonia synthesis, ammoniacal copper treating solutions are used to absorb carbon monoxide from the synthesis gas prior to reaction between the nitrogen and hydrogen. For maximum absorption capacity these solutions must be maintained in a delicate balance between cupric and cuprous ion concentration. If the cuprous to cupric ion ratio becomes too high, copper precipitates and plugs the equipment. If the cupric to cuprous ion ratio is too high the absorption capacity of the solution is reduced. Maintenance of the proper cuprous-cupric ratio in continuous processes has presented a serious problem.

Ammoniacal copper solutions used to absorb carbon monoxide are regenerated by heating and allowing the solution to digest at elevated temperatures. During the heating step ammonia and carbon oxides are liberated as gases and most of the ammonia is reabsorbed by refluxing with unregenerated solution. Solution from the digestion stage of regeneration passes to storage and is recycled to the synthesis gas scrubbing tower. Serious difficulty has been encountered when the cupric ion concentration in this regenerated solution becomes too high, the result being incomplete removal of carbon monoxide from the synthesis gas.

I have found that excellent control of the cupric ion concentration in the regenerated ammoniacal copper solution can be maintained by passing to the digestion stage of the regeneration process small amounts of unregenerated copper solution containing relatively high concentrations of absorbed carbon monoxide which serves to reduce cupric ion to the cuprous state. According to my invention, a dual effect in solution control can be obtained by by-passing both the reflux and heating steps with a portion of the unregenerated copper solution. In following this step, the cupric to cuprous ion ratio is decreased and the overall copper concentration in the solution is increased through evaporation of more water in the reflux stage. Alternatively, solution from the reflux stage can be passed directly to the digestion zone thus by-passing the heating step. In this case overall copper concentration remains substantially the same while the cupric-cuprous ratio is decreased. Passing unregenerated solution directly to the heating step, by-passing the reflux zone, increases the copper concentration with much less effect on the cupric-cuprous ratio. A surprisingly fast response in solution analysis follows an adjustment of stream flow according to my invention.

It is an object of my invention to provide an improved method of removing carbon monoxide from a fluid stream with an ammoniacal copper treating solution.

It is another object of my invention to provide an effective method of controlling cupric ion concentration in an ammoniacal copper treating solution used to absorb carbon monoxide.

Still another object is to prevent high cupric-cuprous ion ratios in such a treating solution.

A further object is to provide an ammonia synthesis process having an improved method of removing carbon monoxide from the synthesis gas.

Other objects, advantages, and features of the invention will be apparent to those skilled in the art from the following description, appendant claims and drawings, in which:

Figure 1:
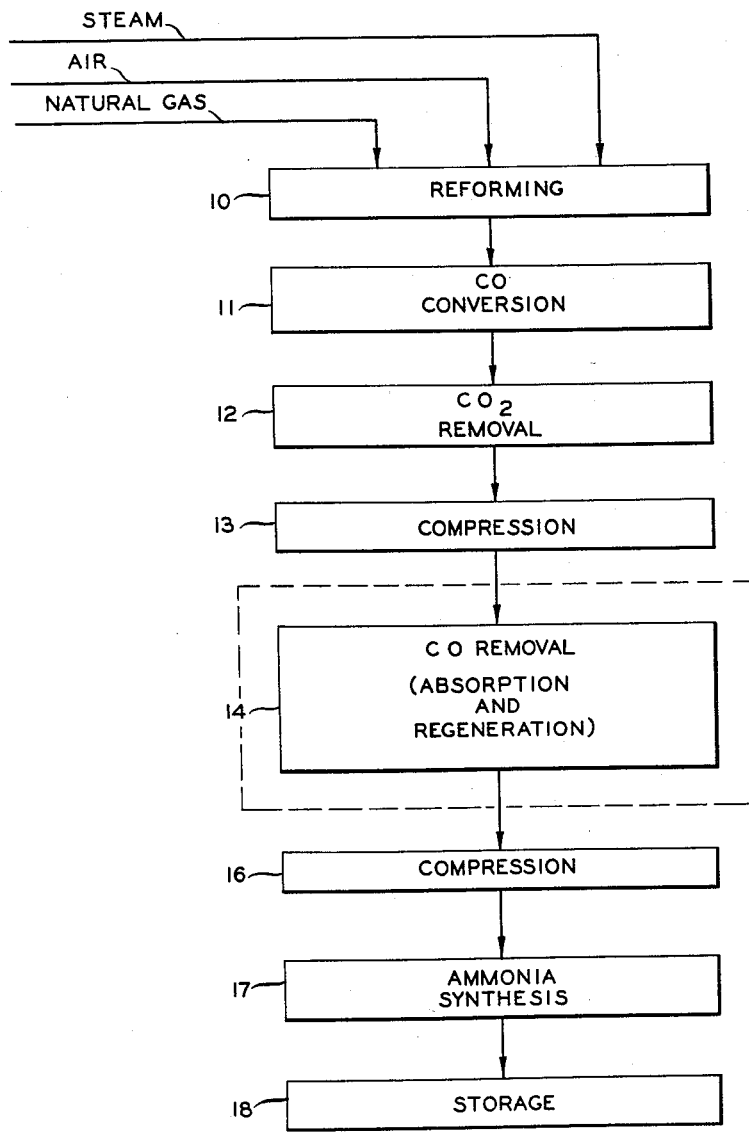
Figure 1 is an operation chart of an ammonia synthesis process.

The synthesis of ammonia employing steam, air and natural gas is a well known process. The overall operation showing the major steps is depicted in Figure 1. Natural gas, containing predominantly methane, is reacted with steam and air in the reforming stage 10 to form a gaseous stream comprising hydrogen and nitrogen in about a 3 to 1 molar ratio with considerable amounts of carbon monoxide and carbon dioxide. A major amount of the carbon monoxide is converted to carbon dioxide in sttage 11 by reaction with steam and the carbon dioxide is removed in stage 12 by absorption in an amine solution. Synthesis gas containing residual amounts of carbon monoxide and carbon dioxide is compressed to high pressures in compression step 13 and the carbon oxides are absorbed in step 14 with an ammoniacal copper solution. The carbon monoxide removal stage 14 has two phases: absorption of the carbon oxides and regeneration of the treating solution. This stage, which is improved by my invention, is depicted in greater detail in Figure 2. Continuing in Figure 1, synthesis gas comprising hydrogen and nitrogen with a negligible amount of the carbon oxides is compressed in stage 16 to the pressure of the synthesis reaction and combined in step 17 by passing over a suitable contact catalyst under heat and pressure to form ammonia which is then cooled, condensed and stored in step 18.

Figure 2:
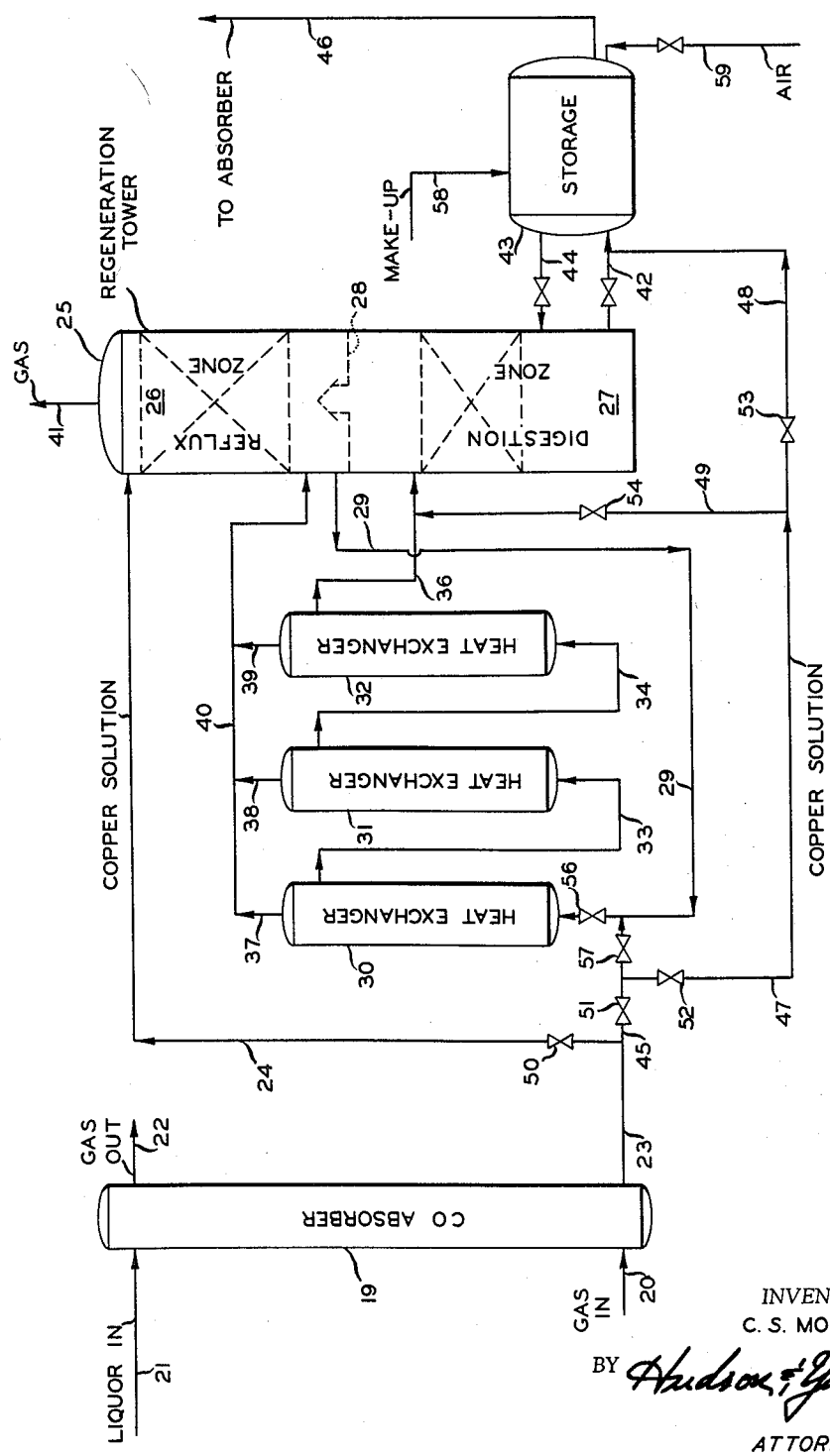
Figure 2 is a schematic flow diagram of the improved carbon monoxide removal system of my invention.

Referring now to Figure 2, for the description of the carbon monoxide removal process, both carbon monoxide and carbon dioxide are absorbed in tower 19 from the synthesis gas which enters at the bottom of the tower through line 20 and leaves through line 22 at the top of the tower for further processing. Ammoniacal copper solution such as a solution of copper ammonium formate and/or copper ammonium carbonate is fed by line 21 to the absorber 19 and flows downwardly over vapor-liquid contacting media to absorb carbon monoxide and the remaining carbon dioxide. Spent solution, which is designated hereinafter as unregenerated copper solution, leaves the absorber through line 23 and passes through line 24 to the regeneration tower 25.

The regeneration of treating solution is basically a heating step in which the solution is elevated to a temperature of about 160 to 180° F. for about 5 to 15 minutes. The pressure is generally atmospheric. During this period the carbon oxides are liberated and cupric salts react with carbon monoxide present to form carbon dioxide and cuprous ions. The solution is then substantially free of absorbed carbon monoxide and contains an equilibrium amount of carbon dioxide as the carbonate. The regenerated solution is cooled and returned to the absorption tower for removal of additional carbon monoxide. Preferably the regeneration process involves three phases which are conveniently labeled (1) reflux, (2) heating, and (3) digestion. In the reflux step, gases liberated in the heating and digestion steps are scrubbed with cold unregenerated solution to reabsorb ammonia vapors. The heating step is self explanatory and the digestion phase allows the reactions of regeneration to proceed to completion.

The regeneration tower comprises a reflux zone 26 in which the unregenerated solution contacts gases comprising ammonia, carbon monoxide and carbon dioxide, absorbing from these gases most of the ammonia present. The lower section of the regeneration tower is the digestion zone 27, which is separated from the reflux zone by a doughnut tray 28 containing a capped chimney riser. Unregenerated solution flows to the top of the regeneration tower, through a spray head and downwardly through the packed reflux section 26 to the tray 28. From the collecting tray the solution passes through line 29 to a series of heat exchangers 30, 31 and 32. Heat exchangers 30 and 31 effect heat exchange between the unregenerated solution and the regenerated solution from the storage tank as it passes back to the absorption tower. Additional heating is supplied by steam for the unregenerated solution in heat exchanger 32. As the copper treating solution passes from the heat exchanger 30 through line 33 to exchanger 31 and thence through line 34 to exchanger 32, its temperature is elevated to that necessary for regeneration of the solution by reaction to liberate and/or oxidize the carbon monoxide absorbed in the treating step. This solution thus heated, passes by line 36 to the lower section, digestion zone 27, of the regeneration tower. This zone normally contains a packed section which effects contact between the liquid and rising vapors. In the heat exchangers, vapors of ammonia and carbon monoxide released pass from the exchangers through lines 37, 38 and 39 into line 40 and reenter the regeneration tower in the lower portion of reflux zone 26. Most of the ammonia is reabsorbed by unregenerated solution in the reflux zone and the carbon oxides are passed through line 41 for processing. Some flashing of carbon monoxide from the inlet solution occurs in the reflux section. It is desirable to maintain a low inlet solution temperature in order to avoid excessive ammonia losses. Solution from the digestion zone passes through line 42 to storage tank 43 which provides additional regeneration time for the treating solution. Gases given off in the storage tank reenter the regeneration tower through line 44 and pass upwardly in contact with the treating solution. Regenerated solution is then passed from storage tank 43 through line 46 and, following several cooling steps which include the heat exchange in exchangers 30 and 31, plus additional cooling, is returned to the absorption tower 19.

Several reactions take place in the regeneration system, but only the wet combustion process is considered in the reduction of cupric ion to cuprous. The wet combustion of carbon monoxide oxidizes the last traces of carbon monoxide and reduces cupric ion to cuprous. Without this reaction complete regeneration of the solution is practically impossible. The reaction is dormant at 32° F. but proceeds quite rapidly at 170° F. Since the wet combustion process is at the expense of the cupric ion, air can be admitted to the system to oxidize the cuprous ion to the cupric ion and maintain the cupric content above the desired lower limit. Air can be added to the system through line 59 to the hot storage tank or into the regeneration section of the tower.

By practicing the steps of my invention the cupric ion content can be conveniently maintained below its upper limit. Such a control is effected by passing a portion of the unregenerated solution from line 23 through lines 45, 47 and 48 to storage tank 43, entering through line 42. In this way a portion of unregenerated solution containing higher amounts of absorbed carbon monoxide than the solution entering the digestion zone through line 36 is supplied to the regeneration section for reaction with the cupric ion. This control is surprisingly effective in reducing cupric ion concentration quickly and furthermore can be safely practiced without endangering the absorption capacity of the treating solution with residual amounts of carbon monoxide. The unregenerated solution can also be introduced to the digestion zone 27 above the packed section through line 49 combining with the heated solution in line 36. Ordinarily by-passing up to 10 weight percent of the unregeneration solution in line 23 to the digestion zone 27 or to the storage tank 43 is sufficient to maintain the desired control. Setting valves 50, 51 and 52 in lines 24, 45 and 47, respectively, enables any desired fraction of the unregenerated solution to by-pass both the reflux zone and the heat exchangers. By setting valves 53 and 54 in lines 48 and 49, respectively, the unregenerated solution can be added to the digestion zone 27, or to storage tank 43 or to both in various ratios.

The effect of by-passing the reflux zone and heat exchangers in this manner is to increase the overall copper concentration and decrease the cupric-cuprous ratio by reduction of cupric ion to cuprous. Since less solution is passing through the reflux zone in contact with the hot rising gases, the temperature in the reflux zone is elevated and more evaporation occurs. This is a convenient method to offset dilution of the solution by various sources such as high moisture content in the feed synthesis gas, steam leaks in the heat exchanger 32, and the like. Naturally, the increased temperature in reflux zone 26 also results in higher ammonia losses, but dilution is the more serious problem.

If it is not desired to affect the overall copper concentration, but only the cupric-cuprous ratio, solution from the reflux section in line 29 is passed directly to the digestion zone 27 through lines 45, 47, 49 and 36. Valves 56, 57 and 52 in lines 29, 45 and 47, respectively, are regulated to pass a portion of this stream directly to the digestion zone, thus by-passing the heat exchangers. This stream, having been through the reflux zone, is not as rich in carbon monoxide as the stream in line 23; hence, as high as 15 weight percent is at times by-passed to the digestion zone. Alternatively, a portion of the stream from line 29 can be passed directly to storage tank 43. This step has the effect of reducing the ratio of cupric ion to cuprous without changing the overall concentration. Dilution control can readily be obtained with a reduced effect upon the cupric-cuprous ratio by passing unregenerated solution from line 23 through lines 45 and 29 directly to heat exchanger 30, thus by-passing only the reflux zone. Generally by-passing up to 25 weight percent of the unregenerated solution around the reflux zone is necessary to change the cupric-cuprous ratio appreciably. Thus, this control method can be conveniently used to control the evaporation in the reflux section and offset any normal dilution occurring in the process. Make-up materials, such as ammonia and copper formate solution, can be added to storage tank 43 through line 58.

The ratio of cupric ions to cuprous ions in the copper treating solution should be about 1 to 5–7. If the cupric to cuprous ratio increases to 1 to 2, the carbon monoxide absorption capacity of the solution is seriously depleted. If the ratio of cuprous to cupric ions gets over about 11 or 12 to 1, copper tends to precipitate out on the equipment and plug the lines. While oxygen can be readily added such as by the admission of air to tank 43 through line 59 to increase the cupric ion concentration, no simple, easily controllable method of quickly reducing the cupric ion has been available before my invention.

To more fully explain the process of my invention, a specific embodiment is discussed in connection therewith. About 22,700 pounds per hour of ammonia sythesis gas containing a 3 to 1 mol ratio of hydrogen to nitrogen with 7.2 weight percent carbon monoxide at 2.8 weight percent carbon dioxide is passed to an ammoniacal copper treating absorption tower at a pressure of about 1800 pounds per square inch gauge at 100° F. Approximately 90,000 pounds per hour of cold copper treating solution at about 40° F. having the composition shown in Table I is passed countercurrently over vapor-liquid contacting media to absorb the carbon monoxide and carbon dioxide from the synthesis gas. Synthesis process gas leaving the absorber contains negligible amounts of carbon monoxide and carbon dioxide. Spent copper treating solution is regenerated by driving off the carbon oxides and the regenerated solution is cooled and returned to the absorption tower.

Unregenerated solution from the absorption tower is passed to a regeneration tower and flows through a reflux zone to absorb ammonia from exhaust gases. In the reflux system the solution is heated to about 100° F. and subsequently, further heat exchange is effected to bring the temperature of the solution up to about 170° F. at which the wet combustion process and other reactions of regeneration proceed quite rapidly. The hot copper solution passes through the digestion section of the regeneration tower to the storage tank where sufficient time is allowed to completely oxidize the carbon monoxide present. Normally about 5 to 15 minutes is sufficient time to allow complete regeneration, although longer periods can be provided if desired. To control the ratio of cupric to cuprous ions in the range of about 1 to 5–7, a portion (less than 15 weight percent) of the solution from the reflux section by-passes the heat exchangers and is fed directly to the digestion zone where residual carbon monoxide effects further reduction of cupric ion present. Make-up ammonia is fed on a continuous basis at about 13 pounds per hour and the proper cupric ion concentration is readily maintained by periodic analysis of the treating solution and corresponding adjustment of the stream from the reflux section which by-passes the heat exchangers. Composition of the copper solution from the hot storage tank is shown in Table I.

TABLE I

*Composition of copper solution in water*

|  | Grams per liter |
| --- | --- |
| Cuprous | 120–125 |
| Cupric | 20–25 |
| Ammonia | 160–180 |
| Formic acid | 40–60 |
| Carbon dioxide | 80–120 |

The components of Table I are present in the solution as cuprous and cupric ammonium formates and carbonates. Maximum absorption capacity for carbon monoxide without danger of copper precipitating out is thus maintained by the control methods of my invention.

Under actual operating conditions comparable to those described in the above embodiment cupric ion concentration was easily maintained in the range of 1.4 to 2.3 grams per 100 millimeters of solution corresponding to a cupric-cuprous ratio of about 1 to 5–8. Immediately prior to initiating the addition of unregenerated solution to the digestion zone, by-passing the reflux and heating stages, cupric concentration had varied widely, being as high as 3.8 grams per 100 millimeters of solution or a cupric-cuprous ratio of about 1 to 3. The reduced effectiveness of the treating solution was quite evident at this point, there being about 6 to 12 parts per million carbon dioxide and carbon monoxide in the synthesis gas leaving the treating unit. After beginning the practice of my invention, the carbon dioxide and carbon monoxide content in the synthesis gas was maintained below 4 parts per million.

Establishing the optimum flow ratios of each by-pass stream for a specific application is a comparatively simple matter. Generally less than one-fourth of the unregenerated liquor is passed directly to the digestion zone. Addition of unregenerated solution to the digestion zone can be intermittent or continuous and the operation can be combined with alternate admission of air to the storage tank to build up cupric content when necessary.

My invention is particularly advantageous because of its flexibility and ease of control. The regeneration temperature need not be altered and it is not necessary to add carbon monoxide to the system in an attempt to restore the proper cupric-cuprous ratio. The digestion time is substantially constant during steady-state operation, thereby simplifying control of the absorption process. Applications of my invention for carbon monoxide removal from streams other than ammonia synthesis gas are possible, but in the ammonia process it is especially valuable.

I claim:

1. In a process for regenerating aqueous ammoniacal copper treating solution used to absorb carbon monoxide comprising a reflux step in a reflux zone in which contaminated solution is used to reabsorb ammonia from gases liberated in regeneration, a heating step in a heating zone in which solution from said reflux zone is heated to regeneration temperature, and a separate digestion step in a digestion zone in which heated solution from said heating zone is permitted to complete the reactions of regeneration, the improved method of increasing the cuprous ion concentration in the regenerated solution with respect to the whole regenerated solution which comprises by-passing said reflux zone with a portion of said contaminated solution and reuniting said portion with the main stream of solution undergoing regeneration.

2. The improved method according to claim 1 wherein said portion of unregenerated solution by-passes both said reflux zone and said heating zone.

3. The improved method according to claim 1 wherein said portion of unregenerated solution by-passes said reflux zone but passes through said heating zone.

4. An improved method of regenerating aqueous ammoniacal copper treating solution used to absorb carbon monoxide so that cupric and cuprous ion concentrations are maintained in proper balance which comprises passing contaminated solution containing absorbed carbon monoxide over vapor-liquid contacting media in contact with hot gases subsequently described thereby evaporating water from said solution, passing unregenerated solution leaving said contacting media to a heat exchange zone, elevating the temperature of said solution in said heat exchange zone to a temperature suitable for regeneration, thereby forming hot solution and gases comprising ammonia and carbon monoxide, passing said gases through said vapor-liquid contacting media, passing said hot solution to a digestion zone to allow completion of the reactions of regeneration, thereby forming a regenerated solution containing substantially no carbon monoxide, determining the cupric and cuprous ion concentrations of said regenerated solution, and in response to low concentrations of both cupric and cuprous ions by-passing a portion of said contaminated solution around said vapor-liquid contacting media, thereby increasing evaporation from the remainder of the solution passing over said media, and reuniting said portion with the main stream of solution undergoing regeneration.

5. In a process for removing carbon monoxide from a gaseous stream which comprises providing an aqueous ammoniacal copper treating solution substantially free of absorbed carbon monoxide, contacting said gaseous stream with said treating solution, thus absorbing carbon monoxide with said solution to produce a gaseous stream substantially free of carbon monoxide and a contaminated treating solution, the improved method of regenerating said treating solution which comprises passing contaminated solution through a reflux zone in contact with heated gases subsequently described to evaporate water from the solution and form a reflux solution, passing said reflux solution to a heating zone wherein a hot solution having a temperature suitable for regeneration is formed and said heated gases comprising ammonia and carbon monoxide are liberated, passing said hot solution to a digestion zone, holding said hot solution in said digestion zone until the reactions of regeneration have become completed, thus forming regenerated solution substantially free of carbon monoxide suitable for recycling to said gaseous stream contacting step, determining the copper concentration in said regenerated solution with respect to the whole regenerated solution and maintaining said copper concentration above a predetermined lower limit by passing a portion of said contaminating solution around said reflux zone and reuniting said portion with the main stream of solution undergoing regeneration.

6. An improved process for regenerating aqueous ammoniacal copper treating solution used to absorb carbon monoxide from a gaseous stream at high pressure and low temperature which comprises passing cold unregenerated solution to a reflux zone at about atmospheric pressure thus flashing carbon monoxide from said solution, contacting said unregenerated solution with heated gases subsequently described thereby warming said solution and evaporating water therefrom, heating warmed solution from said reflux zone in a heating zone to a regeneration temperature of about 160 to 180° F. thus forming a hot regeneration solution and liberating heated gases comprising ammonia and carbon monoxide, passing said heated gases to said reflux zone, passing said hot solution to a digestion zone, holding said hot solution in said digestion zone for at least about 5 to 15 minutes while the reactions of regeneration occur and carbon oxide gases are liberated, passing said carbon oxide gases to said reflux zone, removing regenerated solution from said digestion zone, cooling said regenerated solution by heat exchange with said solution from said reflux zone, cooling said regenerated solution to proper absorption temperature, using regenerated solution thus cooled to absorb carbon monoxide from said gaseous stream, determining the cupric and cuprous ion concentrations in said regenerated solution, in response to low cupric and low cuprous ion concentrations by-passing a portion of said cold unregenerated solution around said reflux zone, thus increasing the temperature and evaporation in said reflux zone, and in further response to high cupric to cuprous ion ratio by-passing said portion around said heating zone, and reuniting said portion with the main stream of solution undergoing regeneration.

References Cited in the file of this patent

UNITED STATES PATENTS

| | | |
|---|---|---|
| 1,739,217 | Dely | Dec. 10, 1929 |
| 2,047,550 | Dely | July 14, 1936 |

FOREIGN PATENTS

| | | |
|---|---|---|
| 680,849 | Great Britain | Oct. 15, 1952 |